Z. S. Ogden.
Carriage Top.
№ 10,373. Patented Jan. 3, 1854.

UNITED STATES PATENT OFFICE.

ZINA S. OGDEN, OF GLENS FALLS, NEW YORK, ASSIGNOR TO LEWIS C. OGDEN.

LOWERING, RAISING, AND FASTENING CARRIAGE-TOPS.

Specification of Letters Patent No. 10,373, dated January 3, 1854.

*To all whom it may concern:*

Be it known that I, ZINA S. OGDEN, of the village of Glens Falls, in the county of Warren and State of New York, have invented a new and Improved Mode of Lowering, Raising, and Fastening Carriage-Tops; and I do hereby declare that the following is a full and exact description of the said invention, reference being had to the accompanying drawing and the letters of reference marked thereon.

Figure 1:
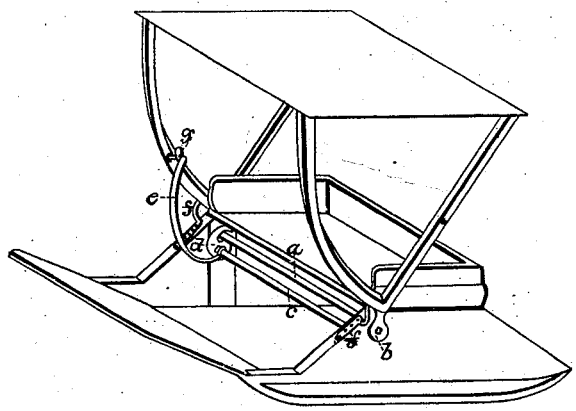
Figure 2:
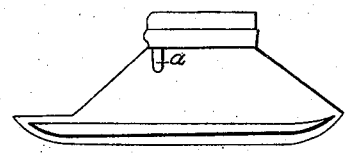
Figure 3:
Figure 4:
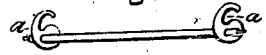

Figure 1, is a perspective view of carriage top body. Fig. 2, is longitudinal elevation of the body; Fig. 3, the shaft to which the bows of the top are attached; Fig. 4, the shaft to which the two eccentric circles, hooks and lever are attached.

The nature of my invention consists in the application of two shafts placed below the seat, one above the other, to raise and to fall, a carriage top with stationary bows and the application of a lever, two eccentric circles, and hooks and two bolts to fasten the top when raised up.

To enable others skilled in the art, to make and use my invention, I proceed to describe its construction and operation.

I construct my carriage top in any of the known forms, with stationary bows, that is without joints in the bows. I fasten the said top to the ends of shaft $a$, Fig. 1, firmly on the outside of the body. Shaft $a$, Fig. 1, plays up and down freely in slots made in each side of the body or box, so that the said shaft rises when the top is let down or lowered, and falls to the bottom of the slots when the top is raised up. Below shaft $a$, Fig. 1, I place shaft $c$, Fig. 1. I attach to said shaft $c$, Fig. 1, a lever $e$, Fig. 1, and an eccentric circle and hook, marked $d$ in Fig. 1, to each end of shaft $c$, in Fig. 1, so that by raising lever $e$, Fig. 1, the hooks pass over shaft $a$, Fig. 1, and hold it down to the bottom of the slots. I also fasten the bolts $f, f,$ Fig. 1, upon the edge of the box or seat, so that they enter the bows as in Fig. 1, $f, f,$ to hold the top firmly when raised.

What I claim as my invention, and desire to secure by Letters Patent is—

The application of the lever, the shafts, eccentric circles hooks and the two bolts to lower raise and fasten carriage tops, with stationary bows, as herein before described.

ZINA S. OGDEN.

Witnesses:
JOSEPH S. PERINE,
BURR STEVENS.